United States Patent [19]
Voise et al.

[11] 3,975,597
[45] Aug. 17, 1976

[54] CALL QUEUE RELEASE CONTROL CIRCUIT

[75] Inventors: Siegfried Voise, Rochester; Thomas M. Wagner, East Rochester; Walter Zeitler, Webster, all of N.Y.

[73] Assignee: Stromberg-Carlson Corporation, Rochester, N.Y.

[22] Filed: Nov. 25, 1974
(Under Rule 47)

[21] Appl. No.: 527,002

[52] U.S. Cl. .................................. 179/27 D
[51] Int. Cl.² ................................ H04Q 3/64
[58] Field of Search ................... 179/27 D

*Primary Examiner*—William C. Cooper
*Attorney, Agent, or Firm*—William F. Porter, Jr.

[57] ABSTRACT

A call queue release control circuit for automatic toll switchboards is disclosed. The call queue release control circuit is supervised by a plurality of multi-position switches that are set in accordance with decisions made at a chief operator position as to the number of different types of calls to be released in an allocation chain. Individual numbers of calls to be released are loaded through guarded inputs into separate presettable counter circuits associated with the type of call to be released. A sequencing circuit addresses the plurality of counter circuits in succession to form the allocation chain. As a particular counter circuit is addressed, the sequencing circuit provides an enabling signal to a call queue control circuit for releasing the type of call associated therewith and receives from the call queue control circuit a confirmation signal for every call released. The confirmation signal is used to clock the counter circuit until an indication that the number of calls preset therein has been released. Upon an indication of a final count being reached the sequencing circuit steps to the next counter circuit in the allocation chain.

4 Claims, 2 Drawing Figures

CALL QUEUE RELEASE CONTROL CIRCUIT

BACKGROUND OF THE INVENTION

The invention relates generally to automatic toll switchboards and is more particularly directed to circuits for effecting the release of queued calls to automatic toll switchboard operators.

Automatic toll switchboards are commonly known in the art to include a plurality of operator positions to assist the general public in establishing a number of operator handled calls. The operator assisted type of calls generally include person-to-person and collect calls (PPCS), operator assisted toll calls, paystation connections, and DDD calls where operator number identification (ONI) is necessary.

Usually, as the different types of calls enter an automatic toll switchboard they are allocated automatically to the first non-busy operator position. However, during peak traffic conditions, a free operator position may not be available and the call must be placed in a waiting state or stacked in a call queue.

A call queue for an automatic toll switchboard can be configured in numerous ways such as a simple push down stack that may be unloaded on a first-in-first-out basis or by more exotic methods.

One advantageous type of call queue for automatic toll switchboards has a number of sectional queue stores where calls are segregated by type as they enter the switchboard to be held in a waiting state. Each sectional store provides a visual indication to the chief operator position as to the number of calls of a certain type queued.

Generally, each sectional queue is sequenced in order to release calls queued therein automatically as operators on the switchboard become available. However, it may happen that more of one type of call is being queued than other types and a longer than usual waiting time is experienced by customers making that type of call. Also, the chief operator may want to assign different priorities to different types of calls thereby reducing the queue times for certain types and increasing them for others.

Therefore, the chief operator should be provided with a means for controlling the automatic release of a queued call of a certain type.

SUMMARY OF THE INVENTION

The invention provides a call queue release control circuit for automatically releasing a predetermined number of calls of a certain type on a call allocation chain.

The allocation chain includes a plurality of counter circuits that are addressed in order by sequencing circuits having enabling means and confirmation means. The enabling means and confirmation means cooperate to release from a call queue a predetermined number of calls set in a particular counter circuit before stepping to the next counter circuit.

The invention provides the chief operator with a plurality of multi-position switches to enter any predetermined number into any of the counter circuits. Thus, the chief operator may decide on the number of different types of calls to be released automatically from a call queue.

The invention further provides guarded input means for protecting the number entered in a particular counter circuit from being altered while the counter circuit is being addressed by the sequencing means. The sequencing means includes means for restarting the allocation chain from any address therein and means for advancing the sequence and clearing a counter circuit when there are no calls of its particular type queued.

Accordingly, it is an object of the present invention to provide a new and improved call queue release control.

Further, it is an object of the invention to provide an automatic call queue release control having means for allowing the chief operator to preset the numbers of the different types of calls to be released.

Still further, it is an object of the invention to provide an automatic call queue release control with guarded input means to protect a preset number, corresponding to calls of a certain type, from being altered while under automatic release.

Another object of the invention is to provide an automatic call queue release control having means to sequence past an empty sectional queue to restart the allocation chain from any address therein.

Other objects and advantages of the present invention will be better appreciated and more readily apparent by reference to the detailed description thereof when considered in connection with the appended drawings.

DETAILED DESCRIPTION OF THE PREFERRED EMBODIMENT

Figure 1:
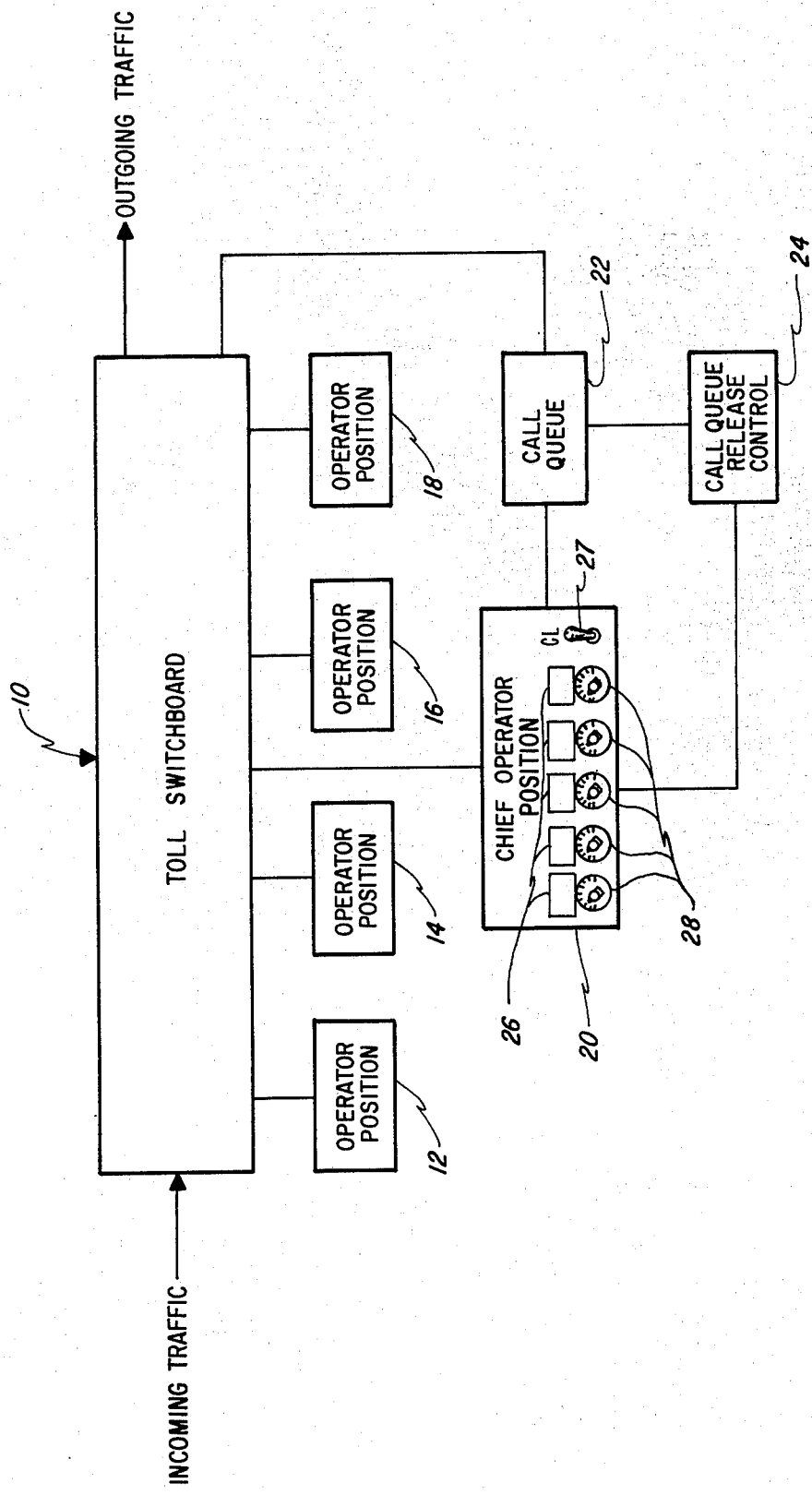
FIG. 1 is a system block diagram of an automatic toll switchboard including a call queue circuit and call queue release control circuit constructed in accordance with the present invention.

An automatic toll switchboard, generally designated 10, and including the call queue release control circuit of the present invention is advantageously illustrated in FIG. 1. The switchboard 10 has provisions for incoming traffic and outgoing traffic and is connected to a plurality of operator positions 12-20 and a call queue circuit 22, the operation of which will be described in greater detail below.

The switchboard 10 normally connects incoming traffic calls automatically to a non-busy operator position 12-20 for operator assisted handling. However, when the incoming traffic becomes greater than the plurality of operator positions 12-20 can handle and the automatic toll switchboard 10 fails to find a free operator, the call queue circuit 22 is enabled by the switchboard. Information pertaining to overflow calls, such as type of call and the identification of the trunk to which an overflow call is connected, is then stacked or queued into the call queue circuit 22 until one of the operator positions 12-20 become free and information for a call may be released. The call queue circuit 22 segregates the queued calls (information) in sectional stores by type and has provision for PPCS, ONI, toll, paystation and auxiliary call sectional stores.

The number of calls of each type stacked or queued in the sectional stores is displayed at the chief operator's position 20 by a plurality of visual indicators 26. The visual indicators 26 instantaneously display to the chief operator, the status of each type of call and whether any particular type of call may be backing up. Associated with each visual indicator 26 is a multi-position switch 28 connected to a call queue release control circuit 24 that is arranged to direct the release of the queued calls from each of the sectional stores.

The chief operator may set each of the multi-position switches L8 to any predetermined number that he decides will clear the corresponding type of call in the sectional store or he may assign a priority for clearing a certain type of call by increasing the number of each type of call cleared per cycle.

The call queue release control circuit 24 then enables the call queue circuit 22 to automatically release the preset number of calls of a certain type and then sequences to the next type of call for release. The automatic release of calls in this manner allows the chief operator to direct the priority of release of queued calls and also allows the chief operator to remain unencumbered from the duty of determining when an operator is free to handle a released call. The chief operator may restart the sequence or allocation chain by switching a clear switch 27 connected to the call queue release control 24.

Although the decision making described is assigned to a chief operator, it should be realized that a hardware or software program could also be utilized for interfacing the call queue circuit 22 and the call queue release control circuit 24.

Figure 2:
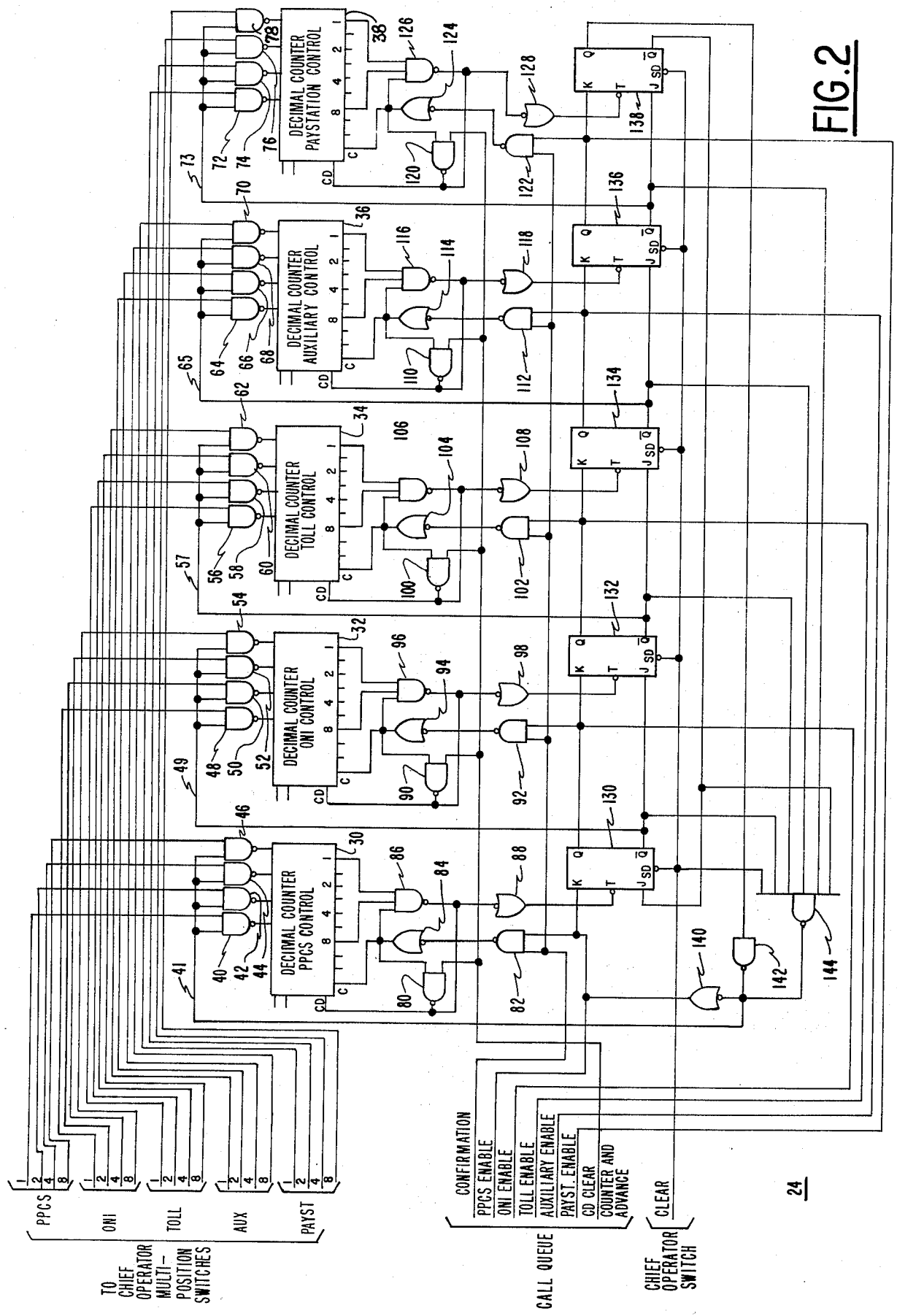
FIG. 2 is a detailed schematic circuit diagram of the call queue release control circuit shown in the automatic toll switchboard illustrated in FIG. 1.

With reference now to FIG. 2, there is illustrated a detailed schematic of the call queue release control circuit, generally designated 24.

The call queue release control circuit 24 includes a plurality of presettable counter circuits 30, 32, 34, 36, 38 which in the preferred embodiment are shown as decimal counters. Each of the counter circuits, for example counter 30, has four input lines for allowing a BCD number presented thereto to preset the counter, and eight output lines, corresponding to the binary form of the stored count and the inversion thereof. A clear direct (CD) control input line for resetting the counter, and a count (C) control input for incrementing the number stored therein are also provided for each counter circuit.

The four input lines to counter 30 are connected to the output lines of input guard gates 40, 42, 44, 46 which are enabled by an input guard line 41 and transmit signals to the input lines of the counter 30 from the multi-position switch 26 assigned to PPCS calls via PPCS lines 1, 2, 4, 8. The PPCS lines transmit the BCD complement of the number which is set in the corresponding multi-position switch 26. In the preferred embodiment, any number from one to ten can be set in any of the multi-position switches 26.

Five control gates 80, 82, 84, 86, 88, connected as shown, direct the counter 30 to increment, clear, and provide a stepping (or "toggle") signal to the next counter circuit 32 in the allocation chain.

Control gates 82, 84 produce an increment signal (IS) via the count line (C) by decoding the coincidence of a confirmation signal (CS) and a PPCS enable signal (EN). The PPCS enable signal is generated when J-K bistable flip-flop 138 has a reset condition and addresses the counter 30 via two loop gates 140, 142. The PPCS enable signal is also used to provide a sequencing signal (SS) to the K input of J-K bistable 130 when a toggle signal (TS) is presented to the T input thereof. The toggle signal, which permits the sequencing signal to reset the J-K bistable 130, is produced when the control gates 86, 88 decode the coincidence of a binary 9 (1001) and the increment signal. The inverted toggle signal transmitted via gate 86 and the CD line is also used to clear the counter 30. The coincidence of an increment signal (IS) and a clear counter and advance signal (CCAS) also clears counter 30 via gate 90 and the CD line.

The other counter circuits are connected similarly, with ONI counter 32 including ONI input lines 1, 2, 4, 8, input guard gates 48, 50, 52, 54, input guard line 49, control gates 90, 92, 94, 96, 98, and a J-K bistable 130; toll counter 34 including toll input lines 1, 2, 4, 8, input guard gates 56, 58, 60, 62, control gates 100, 102, 104, 106, 108 and a J-K bistable 132; auxiliary counter 36 including auxiliary input lines 1, 2, 4, 8, input guard gates 64, 66, 68, 70, input guard line 65, control gates 110, 112, 114, 116, 118 and a J-K bistable 134; and paystation counter 38 including paystation input lines 1, 2, 4, 8, input guard gates 72, 74, 76, 78, input guard line 73, control gates 120, 122, 124, 126, 128, and a J-K bistable 136.

The signals produced to control the counters and the sequence of the allocation chain are given in the following table:

Counter clear (CD) = (IS and CCAS) or (IS and 9)
Counter clock (IS) = EN and confirmation
Toggle (TS) = IS and 9
Enable (EN) = J-K Bistable $\bar{Q}$ = Sequence (SS)

From the foregoing description, it will be apparent that each of the counter circuits 30–38 and their respective connections comprise similar building blocks and, although a particular configuration is illustrated, call queue release control circuit 24 can be contracted or expanded to the number of different types of calls consistent with the particular automatic toll board call queue capability.

The allocation chain is formed by connecting the J-K bistables 130, 132, 134, 136, 138 together to form a serial shift register by coupling Q outputs to J inputs and $\bar{Q}$ outputs to K inputs as shown. A reset condition for each bistable, for enabling the control gates to provide the incrementing signal and for disabling the respective input guard gates, is stepped along or shifted by the stepping or toggle signal of each preceding counter stage until it is fed back through loop gates 140, 142 to start the allocation chain again. The control circuit may be started at the beginning of the chain at any point therein when the clear switch 27 is operated and sets all of the J-K bistables 130, 132, 134, 136, 138 (via the respective SD inputs). The coincidence of the set signals is transmitted to the bistable 130 via loop-gate 144.

In operation, the call queue release control circuit 24 provides for the sequential release of a predetermined number of calls of different types as described by the following example using the ONI counter 32 for descriptive purposes.

The J-K bistable 130 is in a normally set condition, enabling input guard gates 48–54, and thereby allowing the ONI lines 1, 2, 4, 8 to preset the counter 32 to the BCD complement of the number the chief operator has chosen to enter in the corresponding multi-position switch 28.

When the allocation chain is sequenced to ONI calls the counter 32 is addressed by the resetting of J-K bistable 130. The $\bar{Q}$ output signal (low) disables the input guard gates 48–54, thereby protecting the number entered in the counter 32. The Q signal of the J-K bistable 130 provides an ONI enable signal to the control gate 92 and to the ONI sectional queue of the call queue circuit 22. This ONI enable signal allows the sectional queue to release queued ONI calls automatically as operators at positions 12-20 become available to render assistance. Everytime a call is released, a confirmation signal is generated by the call queue circuit 22 and transmitted to the call queue release control circuit 24 and provides the incrementing signal to the counter 32 via the control gate 94 and the enabled control gate 92. The counter 32 is incremented by successive confirmation signals until the counter 32 reaches a final count, signifying that the number of ONI calls released is equal to the number preset on the switch 26. Since the BCD complement of the number was preset in the counter 32, the final count will be 10 (BCD complement of zero) which is decoded via the control gate 88 as the coincidence of 9 (1001) and a confirmation signal. This final count generates a toggle signal which resets the next J-K bistable 132 in the allocation chain via the control gate 98 and also clears the counter 32 via the CD line. If the enable signal is generated by J-K bistable 130 and there are no calls queued in the ONI sectional store, the call queue circuit 32 generates a confirmation signal and a clear counter and advance signal which clears the counter 32 via the gate 90 and the CD line while generating a toggle signal via gates 90, 98 to the next J-K bistable 132 thereby advancing the call allocation chain to the next counter circuit 34.

The sequence from one J-K bistable to the next is followed until the chain is recycled through loop gates 140-142 as described above.

Although a preferred embodiment of the present invention has been described, it should be recognized that various modifications and alterations to structure, obvious to one skilled in the art, may be performed without departing from the spirit and scope of the invention as set forth in the appended claims.

What is claimed is:

1. In an automatic toll switchboard having a call queue circuit for stacking different types of calls into corresponding sectional stores, a call queue release control circuit comprising:

a plurality of presettable counter circuits, each of said counter circuits being associated with a particular type of call to be stored and thereby with a particular sectional store;

input gating circuit means connected to each counter circuit for presetting each counter circuit to a representation of the designated number of calls of a certain type to be released from said call queue circuit;

sequencing circuit means, responsive to a stepping signal for sequentially addressing individual ones of said plurality of counter circuits in a predetermined order to form an allocation chain, said sequencing means including enabling means for generating an enabling signal to enable the particular counter circuit being addressed and for directing the enablement of the sectional store of the call queue circuit associated therewith and including confirmation circuit means for receiving a confirmation signal from a sectional store that a call has been released from said sectional store, and control gating circuit means connected to each counter circuit and responsive to a said enabling signal and a said confirmation signal for incrementing the counter circuit being addressed to a final count equal to the number of calls preset in said counter circuit and for transmitting, in response to said final count, a said stepping signal to said sequencing means, thereby effecting addressing of the next counter circuit in said allocation chain.

2. A call queue release control circuit as defined in claim 1 wherein said input gating circuit means includes input guard circuit means connected to said counter circuits and arranged to prevent the number preset in a said counter circuit from being changed while said counter circuit is being addressed.

3. A call queue release control circuit as defined in claim 1 wherein said sequencing circuit means includes restarting circuit means arranged to address the counter circuit at the beginning of the allocation chain in response to the application of a clear signal to said sequencing circuit means.

4. A call queue release control circuit as defined in claim 1 wherein each said control gating circuit means includes stepping circuit means responsive to the presence of a signal indicating that no calls are stored in a particular sectional store for transmitting a said stepping signal to said sequencing circuit means, thereby advancing said allocation chain to the next counter circuit.

* * * * *